Nov. 13, 1962  F. R. DICKEY, JR  3,064,254
MONOPULSE RADAR WITH LINEAR ERROR VOLTAGE
Filed Oct. 16, 1956
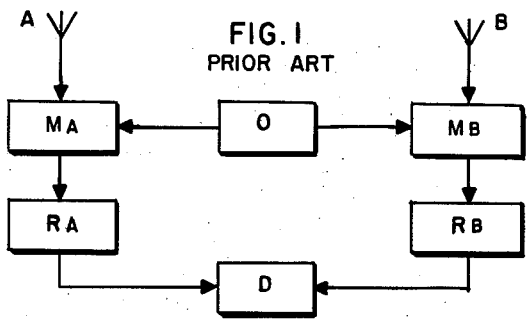
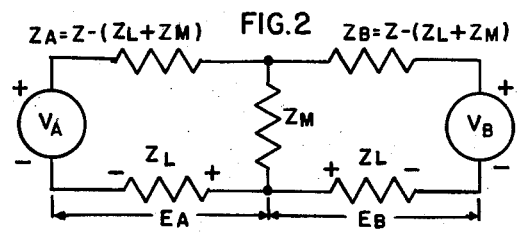
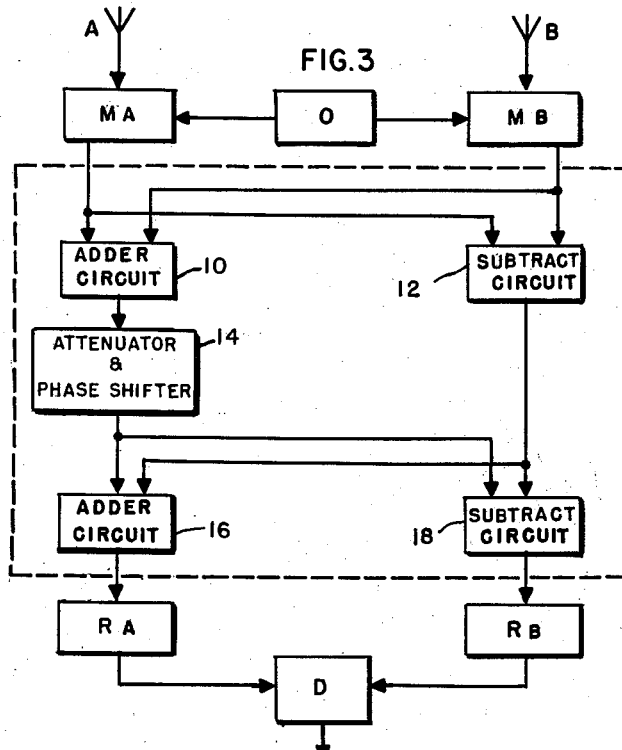
INVENTOR.
FRANK R. DICKEY JR.
BY
*Harry M. Saragovitz*
ATTORNEY

United States Patent Office 3,064,254
Patented Nov. 13, 1962

3,064,254
MONOPULSE RADAR WITH LINEAR ERROR VOLTAGE
Frank R. Dickey, Jr., Dewitt, N.Y., assignor to the United States of America as represented by the Secretary of the Army
Filed Oct. 16, 1956, Ser. No. 616,357
4 Claims. (Cl. 343—113)

This invention relates to searching and tracking radar systems and more particularly to a monopulse type radar system.

The monopulse technique in radar consists in deriving sufficient information from a single pulse by multiple, simultaneously acting receiving channels to determine completely both the angular position and range of the target. In one well known system employing two antenna feeds and two receivers, the azimuth error correction signal is obtained by comparing the phase difference between the outputs of the two receivers. The phase difference between the voltages induced in the two antennas will vary linearly with the target angle but, due to the cross-coupling between the antennas, the voltage signals derived from the output of the antenna feeds and detected in the receivers will not have this linear relationship. Due to this factor, inaccuracies in the error correction signal derived from the phase comparison of the two received signals will result in erroneous target indications.

It is therefore an object of the present invention to provide an improved phase-comparison monopulse radar system having a linear error correction voltage.

It is another object of the present invention to provide an improved phase-comparison monopulse radar system wherein the phase errors due to the mutual coupling between the antenna feeds are effectively eliminated.

It is another object of the present invention to provide an improved phase-comparison monopulse radar system wherein greater accuracy of the angular location of a target with respect to the bore sight axis is achieved.

Briefly, the present invention is directed to a monopulse phase-comparison system wherein the error correction signal is a function of the phase difference between the signal voltages induced in two antennas having a prescribed mutual impedance $Z_M$ therebetween and each having a loop impedance $Z$. Means are provided for maintaining the error voltage proportional to the phase difference between the signals derived from the respective outputs of the antennas. Such means include means for producing respective sum and difference signals of the antenna output signals and means for altering the amplitude and phase of the sum signal by the factor $$\frac{1+\frac{Z_M}{Z}}{1-\frac{Z_M}{Z}}$$

Also included are discrete means for producing respective voltage signals equal to the sum of the altered signal and the difference signal, and equal to the difference of the altered signal and the difference signal.

For a better understanding of the invention together with other and further objects thereof, reference is had to the following description taken in connection with the accompanying drawings in which:

FIG. 1 is a block schematic diagram of a prior art monopulse phase-comparison system;

FIG. 2 illustrates schematically the equivalent antenna feed circuit of the prior art system shown in FIG. 1; and FIG. 3 is a block schematic diagram illustrating the present invention.

FIG. 1 illustrates a conventional phase-comparison monopause system wherein the discrete outputs from the two antennas A and B are heterodyned by the output from a common oscillator O. The output from the respective mixers MA and MB are applied to respective IF amplifiers RA and RB and the outputs of the IF amplifiers are compared in a linear phase detector D to produce a voltage proportional to the phase difference between the output of the two receivers. The phase relationship existing between the respective input and output voltages of antennas A and B may be readily shown by means of FIG. 2 which represents the equivalent circuit of the two similar antennas having mutual coupling therebetween designated by $Z_M$ and respective input impedances $Z_A$ and $Z_B$. The respective induced antenna voltages $V_A$ and $V_B$ are assumed to be equal except for the phase difference $\phi$, that is $$\frac{V_A}{V_B}=e^{j\phi} \tag{1}$$

In terms of the antenna load impedance $Z_L$, the antenna loop impedance $Z$ and the mutual impedance $Z_M$, the two antenna output voltages $E_A$ and $E_B$ may be derived by simple circuit analysis and shown to be $$E_A=V_A\frac{Z_{L/Z}}{1-\left[\frac{Z_M}{Z}\right]^2}\left[1-\left[\frac{Z_M}{Z}\right]e^{-j\phi}\right] \tag{2}$$

and $$E_B=V_B\frac{\frac{Z_L}{Z}}{1-\left[\frac{Z_M}{Z}\right]^2}\left[1-\left[\frac{Z_M}{Z}\right]e^{+j\phi}\right] \tag{3}$$

The factors shown in the brackets of Equations 2 and 3 are functions of the phase difference $\phi$ due to the effect of the mutual coupling $Z_M$ which causes undesirable phase errors.

In FIG. 3 there is shown the improvement comprising the present invention which compensates and corrects for the effects of the coupling between the antenna feeds A and B. Referring now to FIG. 3, the voltage outputs $E_A$ and $E_B$ from respective mixers MA and MB are combined in a first adder or sum circuit 10 and a first subtractor or difference circuit 12 to provide the respective sum and difference voltage signals $\Sigma=E_A+E_B$ and $\Delta=E_A-E_B$. Such adder and subtractor circuits are well known in the art and no further description thereof is believed necessary. The sum signal output from adder circuit 10 is applied to an attenuating and phase shifting circuit 14 which is adapted to alter or, in effect, multiply the amplitude and phase of the sum signal $\Sigma=E_A+E_B$ by a factor $$\frac{1+\frac{Z_M}{Z}}{1-\frac{Z_M}{Z}}$$

where this factor is a complex number having an absolute value which expresses the required amplitude ratio and having an angle which expresses the required phase shift and where, as explained above, $Z_M$ is the value of the mutual impedance between the two antennnas and $Z$ is the respective loop impedance of the two antennas. The values $Z_M$ and $Z$, of course, may be measured or derived in any conventional manner well known in the art. As shown, the altered sum signal is respectively combined with the difference signal $\Delta=E_A-E_B$ in a second adder circuit 16 and in a second subtractor circuit 18. The outputs of second adder circuit 16 and second subtractor circuit 18 are respectively applied to IF amplifiers RA and RB, and the output of the IF amplifiers are compared in linear phase detector D as shown.

The network 14 may consist of an attenuator and a phase shifter connected in cascade or it may consist of a single network designed to provide both the desired change in amplitude and the desired value of phase shift. Furthermore, if the absolute value of the factor discussed above, is greater than one, it may be necessary to place the network in the output of subtractor 12 instead of in the output of adder 10. For convenience in making adjustments it may be desirable to place a network in each of the two locations.

The theory of operation of the present invention is based on the fact that the voltage $V_A$ and $V_B$ induced in antennas A and B, respectively, are derived from $E_A$ and $E_B$ by linear transformation independent of the phase angle $\phi$. This can be shown by utilizing the relationship set forth in Equations 1, 2, and 3. Let S represent the quantity $$\frac{\frac{Z_L}{Z}}{1-\left(\frac{Z_M}{Z}\right)^2}$$

and let U represent the quantity $$\frac{Z_M}{Z}$$

Now, by adding and subtracting Equations 2 and 3 we have $$E_A+E_B=SV_A(1-Ue^{-j\phi})+SV_B(1-U^{+j\phi}) \quad (4)$$

and $$E_A-E_B=SV_A(1-Ue^{-j\phi})-SV_B(1-U^{+j\phi}) \quad (5)$$

Since from Equation 1

$$\frac{V_A}{V_B}=e^{j\phi} \text{ and } \frac{V_B}{V_A}=e^{-j\phi}$$

these values may be substituted in Equations 4 and 5 for $e^{-j\phi}$ and $e^{+j\phi}$, and as a result we have $$E_A+E_B=S(V_A+V_B)(1-U) \quad (6)$$

and $$E_A-E_B=S(V_A-V_B)(1+U) \quad (7)$$

From Equation 6 the value of $V_B$ in terms of $V_A$ may be readily derived as follows:

$$V_B=\frac{E_A+E_B}{S(1-U)}-V_A \quad (8)$$

Substituting this value for $V_B$ in Equation 7 and solving for $V_A$ we arrive at the following equation:

$$V_A=\frac{1}{2S(1-U^2)}[(E_A+E_B)(1+U)+(E_A-E_B)(1-U)] \quad (9)$$

Inasmuch as $$S=\frac{\frac{Z_L}{Z}}{1-U^2}$$

where $$U=\frac{Z_M}{Z}$$

we have $$V_A=\frac{Z}{2Z_L}\left[(E_A+E_B)\left(1+\frac{Z_M}{Z}\right)+(E_A-E_B)\left(1-\frac{Z_M}{Z}\right)\right] \quad (10)$$

In a similar manner it can be shown that $$V_B=\frac{Z}{2Z_L}\left[(E_A+E_B)\left(1+\frac{Z_M}{Z}\right)-(E_A-E_B)\left(1-\frac{Z_M}{Z}\right)\right] \quad (11)$$

It is apparent from Equations 10 and 11 that to obtain the results desired, the sum $\Sigma=E_A+E_B$ should be changed in amplitude and phase by the factor $$1+\frac{Z_M}{Z}$$

and the difference $\Delta=E_A-E_B$ should be changed in amplitude and phase by the factor $$1-\frac{Z_M}{Z}$$

Since only the phase, not the amplitude, of the output is of interest, the actual requirement is that the gain and phase shifts of the sum and difference channel differ in accordance with the factor $$\frac{1+\frac{Z_M}{Z}}{1-\frac{Z_M}{Z}}$$

As shown in FIG. 3, the sum and difference signals $\Sigma=E_A+E_B$ and $\Delta=E_A-E_B$ are derived respectively from adder circuit 10 and subtractor circuit 12. The desired output signals are obtained by sending the sum $(E_A+E_B)$ through the network 14 having a transfer function given by the factor $$\frac{1+\frac{Z_M}{Z}}{1-\frac{Z_M}{Z}}$$

and then deriving another sum and difference signal by means of second adder circuit 16 and second subtractor circuit 18. By such addition and subtraction, the signals applied to phase detector D from the IF amplifiers RA and RB will be in phase with $V_A$ and $V_B$, respectively. The same result is achieved if the first sum and difference signals are sent through networks having transfer functions given respectively by $$1+\frac{Z_M}{Z} \text{ and } 1-\frac{Z_M}{Z}$$

before being applied to adder circuit 16 and subtractor circuit 18.

Although the linearizing circuits shown in FIG. 3 are added after the mixer stages MA and MB, that is, at the IF level, it is to be understood of course that the linearization circuits described hereinabove may be added at the RF level before the mixer stages. Well known microwave hybrid circuits such as magic-tees would be used in this case.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a monopulse phase-comparison system wherein the error correction signal voltage is a function of the phase difference between the respective signal voltages induced in two antennas having a prescribed mutual impedance $Z_M$ therebetween and each having a loop impedance Z, means for maintaining the error voltage proportional to the phase difference between the signals derived from the respective outputs of said antennas comprising: means for producing respective sum and difference signals of said output antenna signals, means for multiplying the amplitude and phase of said sum signal by the factor $$\frac{1+\frac{Z_M}{Z}}{1-\frac{Z_M}{Z}}$$

and discrete means for producing respective voltage signals equal to the sum of said multiplied signal and said difference signal, and equal to the difference of said multiplied signal and said difference signal.

2. In a monopulse system wherein the relative phase of respective signals induced in two similar antennas varies linearly with the target angle relative to the bore sight axis, means in circuit with the output signals of said antenna for maintaining the linearity of said induced signals comprising: a first adder circuit for producing the sum signal of the antenna output signals, a first subtractor circuit for producing the difference signal of the antenna output signals, a network responsive to the sum signal and having a transfer function given by the factor $$\frac{1+\frac{Z_M}{Z}}{1-\frac{Z_M}{Z}}$$

where $Z_M$ is the mutual impedance between both antennas and $Z$ is the loop impedance of each antenna, a second adder circuit for producing the sum signal of the output of said network and said difference signals, and a second subtractor circuit for producing the difference signal of the output of said network and said difference signal.

3. In a monopulse phase-comparison system wherein the error correction signal voltage is a function of the phase difference between the signal voltages induced in two antennas having a prescribed mutual impedance $Z_M$ therebetween and each having a loop impedance $Z$, means for maintaining the error voltage proportional to the phase difference between the signals derived from the respective outputs of said antennas, said means comprising: means for producing respective sum and difference signals of said output antenna signals, means for multiplying the amplitude and phase of said sum and difference signals by the factors $$1+\frac{Z_M}{Z} \text{ and } 1-\frac{Z_M}{Z}$$

respectively, and means for respectively adding and subtracting said multiplied sum and said multiplied difference signal.

4. In a monopulse phase-comparison system wherein the error correction signal voltage is a function of the phase difference between the signal voltages induced in two antennas having a prescribed mutual impedance $Z_M$ therebetween and each having a loop impedance $Z$, means for maintaining the error voltage proportional to the phase difference between the signals derived from the respective outputs of said antenna comprising: means for producing respective sum and difference signals of said output antenna signals, a first network responsive to said sum signal and having a transfer function given by the factor $$1+\frac{Z_M}{Z}$$

a second network responsive to said difference signal and having a transfer function given by the factor $$1-\frac{Z_M}{Z}$$

means for producing the sum signal of the outputs of said first and second networks, and means for producing the difference signal of the outputs of said first and second networks.

References Cited in the file of this patent

UNITED STATES PATENTS

| | | |
|---|---|---|
| 2,147,810 | Alford | Feb. 21, 1939 |
| 2,687,520 | Fox | Aug. 24, 1954 |
| 2,713,164 | Baum | July 12, 1955 |